United States Patent [19]

Song

[11] Patent Number: 5,379,367
[45] Date of Patent: Jan. 3, 1995

[54] LINEAR INTERPOLATING METHOD FOR ROBOT CONTROL

[75] Inventor: Jin-Il Song, Inchon, Rep. of Korea

[73] Assignee: Samsung Electronics Co., Ltd., Suwon, Rep. of Korea

[21] Appl. No.: 813,925

[22] Filed: Dec. 27, 1991

[30] Foreign Application Priority Data

Dec. 28, 1990 [KR] Rep. of Korea .................. 90-22320

[51] Int. Cl.$^6$ .................. G05B 19/415; B25J 9/16; B25J 13/00
[52] U.S. Cl. ........................ 395/87; 395/89; 318/562.15; 364/474.31; 364/474.35
[58] Field of Search ........... 395/87, 97, 89, 86, 395/97; 364/474.31, 474.3, 474.35; 318/568.15, 568.18, 574; 901/2, 15, 20

[56] References Cited

U.S. PATENT DOCUMENTS

| | | | |
|---|---|---|---|
| 4,528,632 | 7/1985 | Nio et al. | 364/169 |
| 4,683,543 | 7/1987 | Hirasawa et al. | 364/513 |
| 4,689,756 | 8/1987 | Koyama et al. | 364/513 |
| 4,728,872 | 3/1988 | Kishi et al. | 318/568 |
| 5,020,001 | 5/1991 | Yamamoto et al. | 364/513 |
| 5,083,072 | 1/1992 | Song | 318/571 |
| 5,142,207 | 8/1992 | Song | 318/615 |

*Primary Examiner*—Robert W. Downs
*Attorney, Agent, or Firm*—Burns, Doane, Swecker & Mathis

[57] ABSTRACT

A linear interpolating method used for controlling the movement of a robot in which a speed distribution at the time of linear movement of a multi-articular robot involves a linear acceleration and deceleration so that precision of movement is improved at a driving start point and an end point of the robot. Linear acceleration and deceleration are realized by a discrete time state equation so that a sampling time is reduced and the precision of a straight line is improved while making high speed movement possible. The method computes a positional deviation on the basis of the present position and a target position and then exact driving is maintained via compensating for positional deviation.

6 Claims, 6 Drawing Sheets

LINEAR INTERPOLATING METHOD FOR ROBOT CONTROL

FIELD OF THE INVENTION

The present invention relates to a method for linearly moving an end-effector of an arm of a multi-articular robot on an X-Y plane of a rectangular coordinate system, and more particularly, relates to a linear interpolating method of robot control in which a speed distribution upon a rectilinear movement is linearly executed. The precision of a driving start point and a driving end point of the robot are thus improved and a linear acceleration or deceleration is realized by a discrete time state equation to result in a reduced sampling time and while improving precision of a straight line movement and making possible a high speed movement.

BACKGROUND OF THE INVENTION

Generally, there has been a method in which a straight line is divided by a predetermined interval upon which a linear interpolation of a robot movement and a point-to-point (PTP) movement is executed. The PTP movement is executed by taking a very small distance of a straight line and driving the robot along a path of said divided straight line. However, this method has had a problem in that the precision of the rectilinear movement is reduced at the driving start and the driving end of the robot movement.

A position determining control system disclosed in Japanese Laid-Open Patent Publication Showa 62-62363 can be cited as a concrete, conventional example. However, this position determining control system involves making a position determination of high precision in a position determining control system, which corrects an error in a movement control amount at a check point. This system comprises a first means which recognizes a present position of a moving means on the basis of the moving means and a tacho-pulse output from a motor for moving the robot within a coordinate system. The system controls the driving of said motor in accordance with the result of the first means. The system also determines the position of the moving means relative to a target position on the coordinates system. A second means reads a position signal of a wider width than the tacho-pulse from the coordinate system when the moving means passes a particular check point on the coordinate system. This system further includes a third means which amends a result of recognition of the present position of the moving means by the first means by applying an intermediate point in a position signal read by the second means, as a positional reference. The third means corrects a difference between an actual position and the present position of the moving means recognized by the first means every time the moving means passes the check point.

Such a conventional system has had an advantage in that a square pulse of relatively wider width is used as a position signal and a deviation is detected by applying the intermediate point of the position signal as a positional reference signal. However, it has had a disadvantage in that not only it is not effective for driving a robot a short distance (despite it being useful for a robot which drives for a relatively long distance), but the acceleration or deceleration in response to a situation is impossible and also a high speed operation is impossible.

Japanese Laid-Open Patent Publication Showa 57-211491 can be also cited, wherein the system is constituted such that an object of a robot body to be controlled is moved at a predetermined speed between a plurality of predetermined pass-through positions. A track is controlled so as to be smoothly moved while automatically accelerating/decelerating following a parabola by adopting the same rectilinear speed as a rectilinear speed on an inscribing parabola, which is determined by an error quantity of the pass-through position in the vicinity of said position and by a previously set position at the vicinity of the position, so that an operator can voluntarily presume the error quantity corresponding to passing through the particular vicinity. Thereby, the pass-through points can be continuously moved with a smooth speed without stopping at every respective pass-through point, and thus a desirable-movement performance without vibration at the pass-through point is obtained.

However, such conventional position control system has had problems in that there are so many structural elements of the device for realizing the position control, and the positional error amount is voluntarily presumed by an operator. Accordingly, not only an error operation for the position control, which requires a high precision, is necessary, but also a high speed movement is impossible.

SUMMARY OF THE INVENTION

Therefore, the present invention is made considering the above-described problems, and an object of the present invention is to provide a linear interpolating method of a robot which improves the precision of rectilinear movement at the time of a driving start and a driving end of the robot by linearly accelerating or decelerating (collectively referred to as acceleration) a speed distribution at the time of linear movement of the robot.

Another object of the present invention is to provide a linear interpolating method of a robot in which a linear acceleration or deceleration is realized by a discrete time state equation and thereby a sampling time is reduced so that an precision of a straight line is improved and a high speed rectilinear movement is possible.

In order to achieve the above-described objects, the linear interpolating method of a robot movement according to the present invention includes: a first step of obtaining a present position and a target position in X-Y plane (World coordinate system) by a kinematical equation by utilizing a present position and a last target position of the robot at an articular coordinate system (whether Cartesian or polar), and a second step of comparing the magnitudes of a moving distance of X-axis and a moving distance of Y-axis in said X-Y plane, making the moving speed along a straight line for an axis of the larger moving distance correspond to a predetermined value. The invention further includes obtaining a number of moving times based on the moving quantity at every sampling time when acceleration or deceleration is not present and a third step of obtaining a moving distance at every sampling time when no acceleration or deceleration is present, based on said moving number of times for a shorter axis of the moving distance. The invention additionally includes a fourth step of comparing a quantity of positional increments at every sampling time by a discrete time state equation in order to execute a linear acceleration or deceleration based on the moving quantity of each axis and thereafter computing a moving pulse of each articulation of the robot arm by an inverse kinematical equation. The invention further includes a fifth step of computing a positional deviation by detecting the present position of each axis, executing a proportional integral and differential control on said positional deviation and thereafter outputting a driving signal of a servomotor.

Other features and objects of the present invention will become apparent from the following description of the preferred embodiment taken in conjunction with the accompanying drawings.

DESCRIPTION OF THE PREFERRED EMBODIMENT

Hereinafter, a preferred embodiment of the present invention will be described in detail with reference to the accompanying drawings.

Figure 1:
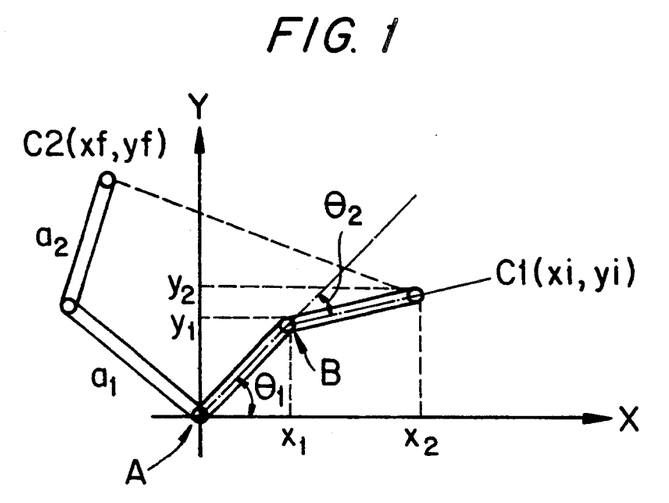
FIG. 1 is a diagram of a conception of a rectilinear movement of an end effector of a robot arm in X-Y plane of a horizontal multi-articular robot.

FIG. 1 shows that a robot having two arms $a_1$, $a_2$ which move linearly from a present position $C1(xi, yi)$ to a target position $C2 (xf, yf)$ in the X-Y plane of the rectangular coordinate system, wherein a servomotor for driving each arm is mounted to an articulation A and an articulation B. Thus, the servomotor is controlled by a servo-control section and thereby an arm of the robot is moved within a working area.

Figure 2:
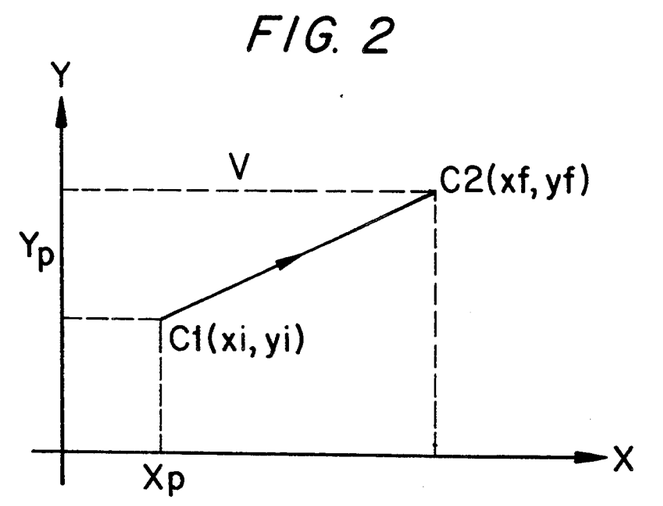
FIG. 2 is a graph for the moving amount of X axis and Y axis of X-Y plane on a rectangular coordinates.
Figure 3:
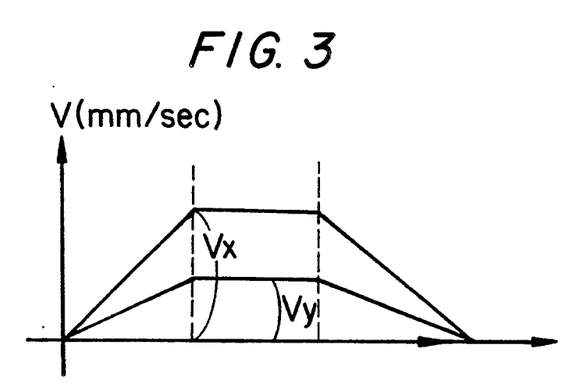
FIG. 3 is a diagram of distribution with respect to the X and Y coordinates for a rectilinear movement in X-Y plane on the rectangular coordinates.

In FIG. 2 and FIG. 3, in order to draw a straight line on the X-Y plane, a ratio of a moving speed along the X-axis to a moving speed along the Y-axis should be set to a constant as Yp/Xp. That is, in order to move along a straight line on the X-Y plane, a ratio of distance to be moved at every sampling time on each of the coordinates should be set to a constant. Therefore, the shorter the sampling time, the more precise the straight line.

Figure 5:
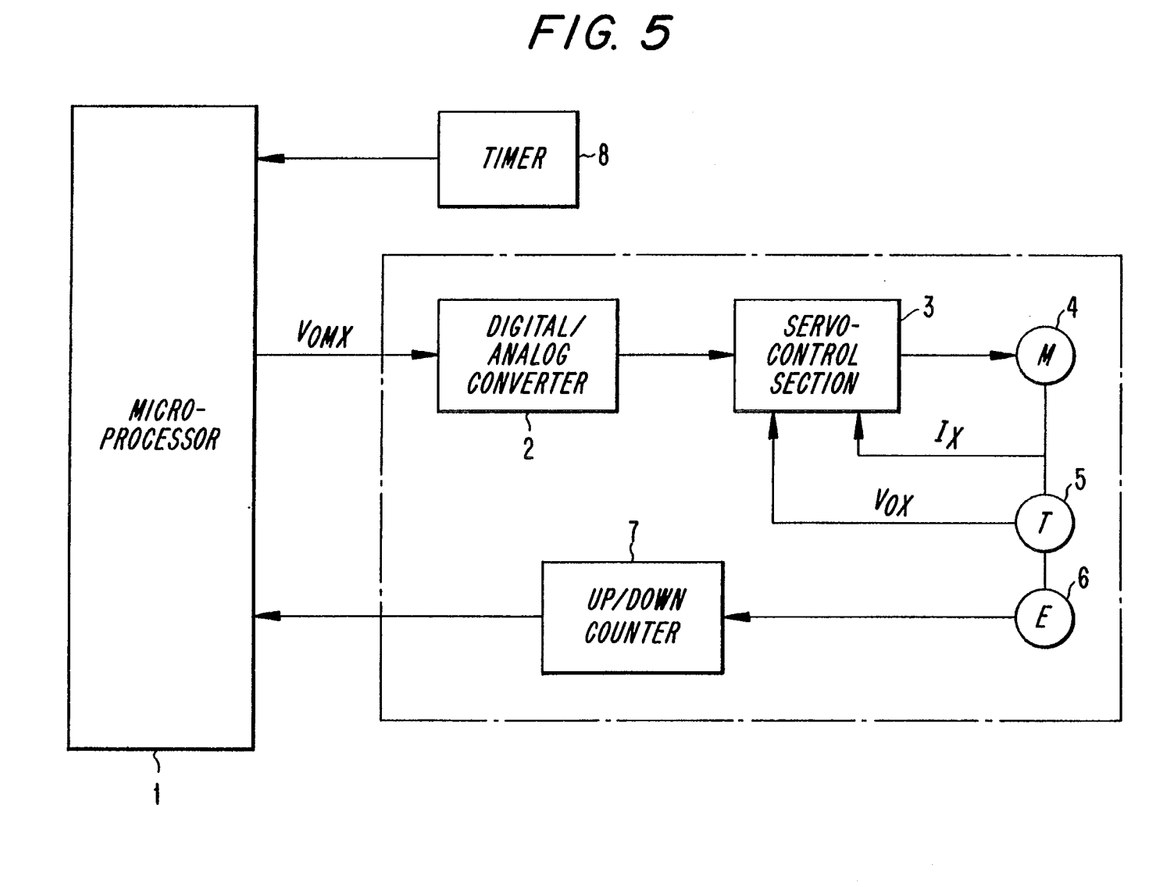
FIG. 5 is a block diagram for realizing a linear interpolating method of a robot of the present invention.

In FIG. 5, a reference numeral 1 refers to a microprocessor which outputs a speed command signal for driving a servomotor 4 at a certain speed. A reference numeral 2 references a digital/analog converter which converts a digital speed command signal output from said microprocessor 1 into an analog value, which inputs the converted analog value to a servo control section 3, and outputs a command signal for driving a servomotor 4 to a forward direction and reverse direction, based on the direction for moving, in response to the requirement of the robot in the working area and a signal of the driving speed.

Reference numeral 3 references a servo-control section which, when a current feed back signal Ix of a current for driving the servomotor 4 is fed back and a speed feed back signal Vox detected in accordance with the driving speed of said servomotor 4 by a tacho-generator 5 is fed back, the servo-control section 3 controls the servomotor 4 by utilizing said current feed back signal Ix and the speed feed back signal Vox.

A reference numeral 7 refers to an up/down counter which up-counts or down-counts a pulse signal output from an encoder 6. The encoder 6 outputs a pulse signal in accordance with the driven rotational quantity of said servomotor 4 on the basis of a reference signal and thereby inputs a present position of the robot to the microprocessor 1 so as to control the driving speed and the position of the robot. Also, a reference numeral 8 refers to a timer which executes correct driving control of the robot by interrupting said microprocessor 1 at every predetermined period.

Figure 6A:
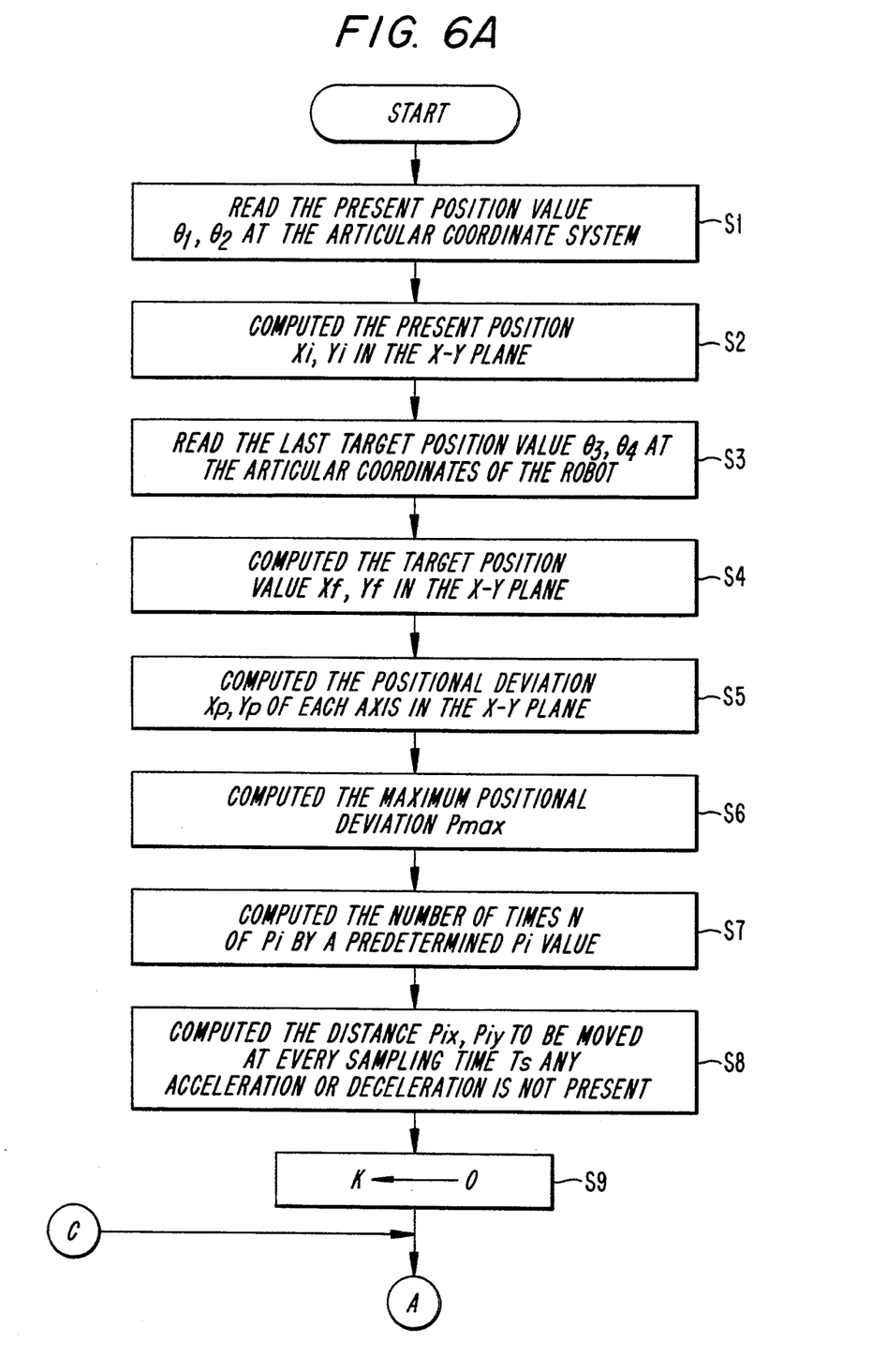
FIG. 6A–6C are a flow chart which illustrates an operating sequence of the present invention.
Figure 6B:
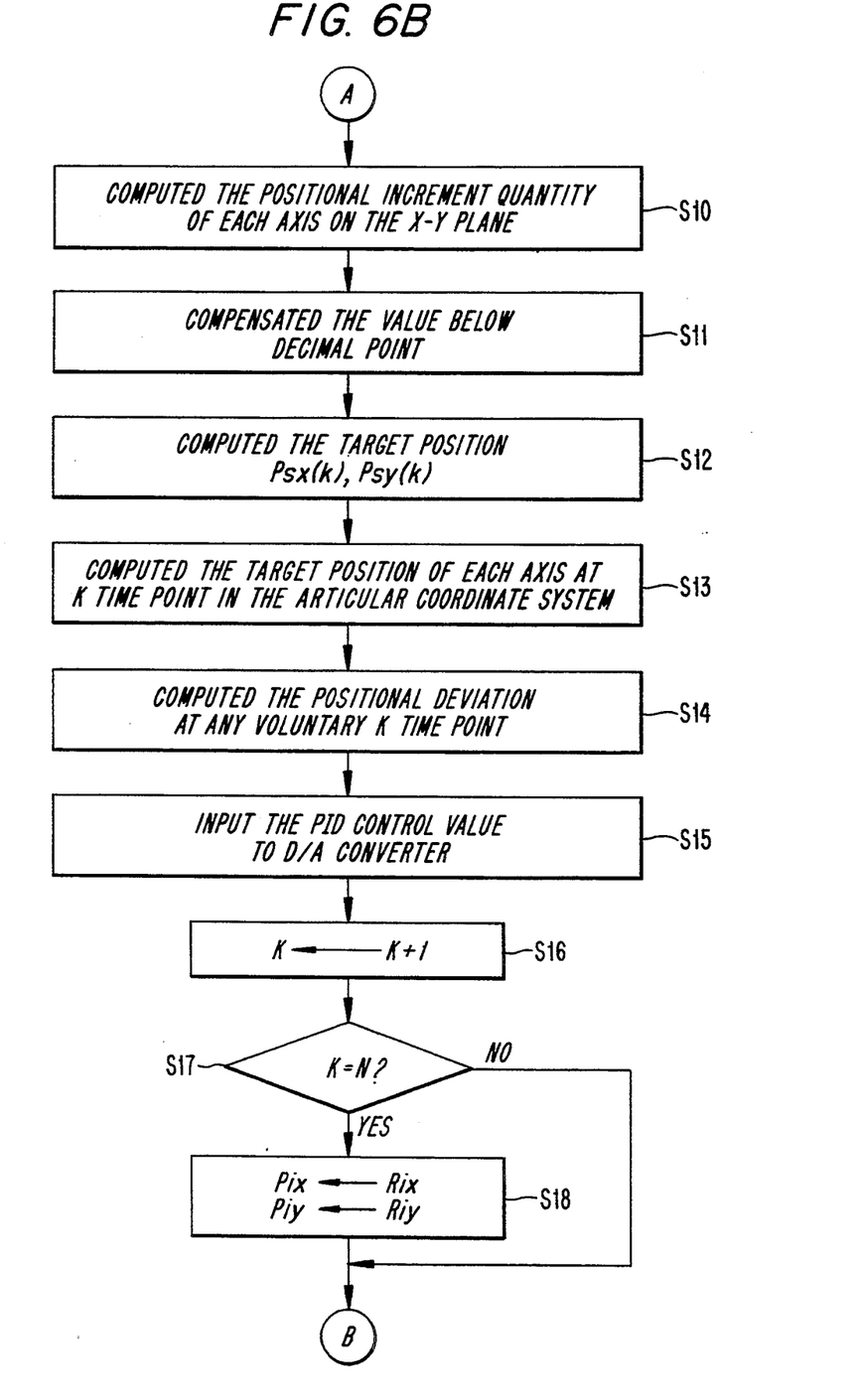
Figure 6C:
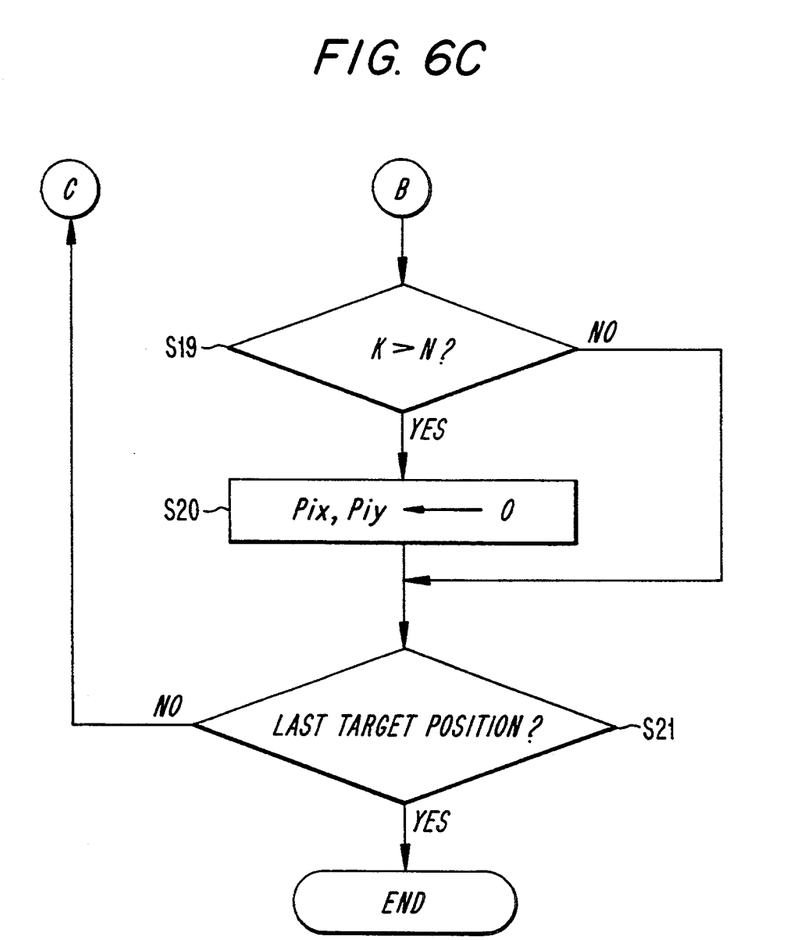

Next, FIG. 6 will be described in relation to the FIG. 1 through FIG. 5. In FIG. 6, a reference symbol S means a step.

When the linear interpolating method of the robot according to the present invention is started, first at step S1, as shown in FIG. 1, the up/down counter 7 read in the present position value $\Theta_1$, $\Theta_2$ at the articular coordinate system of the horizontal multi-articular robot from the encoder 6 which outputs a pulse signal in response to the rotational quantity of the servomotor 4 and then inputs said value to the microprocessor 1. At a step S2 a position xi, yi in the X-Y plane is obtained by utilizing a following expression.

$$xi = a_1 \cos \Theta_1 + a_2 \cos (\Theta_1 + \Theta_2) \quad (1)$$

$$yi = a_1 \sin \Theta_1 + a_2 \sin (\Theta_1 + \Theta_2) \quad (2)$$

wherein $a_1$: a length of first arm of the robot, and
$a_2$: a length of second arm of the robot.

When the present position xi, yi in said X-Y plane is obtained, the method advances to a step S3 and the last target value (presumed as $\Theta_3$, $\Theta_4$) at the articular coordinates of the robot is read, and at a step S4 a target position value xf, yf in the X-Y plane is obtained on the basis of the last target values $\Theta_3$, $\Theta_4$ which was read at step S3, i.e., $$xf = a_1 \cos \Theta_3 + a_2 \cos (\Theta_3 + \Theta_4) \quad (3)$$

$$yf = a_1 \sin \Theta_3 + a_2 \sin (\Theta_3 + \Theta_4) \quad (4)$$

According to these equations, and as shown in FIG. 2, the positional deviation of each axis in the X-Y plane is obtained at a step S5, but a moving quantity xp of a X-axis direction is obtained by $$xp = xf - xi \quad (5)$$

and a moving quantity yp of a Y-axis direction is obtained by $$yp = yf - yi \quad (6).$$

When assuming that the distance to be traveled on the X-axis is large, the magnitudes of the moving quantity xp of said X-axis direction and the moving quantity yp of the Y-axis are compared with the linear moving speed assumed to be V [mm/sec], then the moving speed on said X-axis is set as V [mm/sec]. When a distance to be moved at every sampling time Ts (in case where no acceleration or deceleration is present) is assumed as Pix [mm], the distance Pix to be moved at every sampling time in case where no acceleration or deceleration is present is Pix=V·Ts [mm].

For instance, when the moving speed of the straight line is 1000 [mm/sec], and the sampling time Ts is 10 [msec], the distance Pix to be moved at every sampling time in case where no acceleration or deceleration is present is $$Pix = V \cdot Ts = 1000[mm/sec] \cdot 10 \times 10^{-3}[sec] = 10[mm].$$

After the positional deviation xp, yp of each axis has been obtained at step S5, a maximum positional deviation by an equation Pmax=MAX {Xp, Yp} is obtained at step S6, and at a step S7, the number of times N Pi obtains a predetermined Pi value is determined. Thus, in cases where the maximum positional deviation is equal to the positional deviation of X-axis (Pmax= Px), the number of times N the distance to be moved at every sampling time Ts in case where no acceleration or deceleration is present is obtained by N=Px/Pix, wherein the remainder is Rix.

Accordingly, at a step S8, a distance (Pix, Piy) to be moved at every sampling time Ts in case where no acceleration or deceleration is present is obtained by the expression appearing below.

Figure 4:
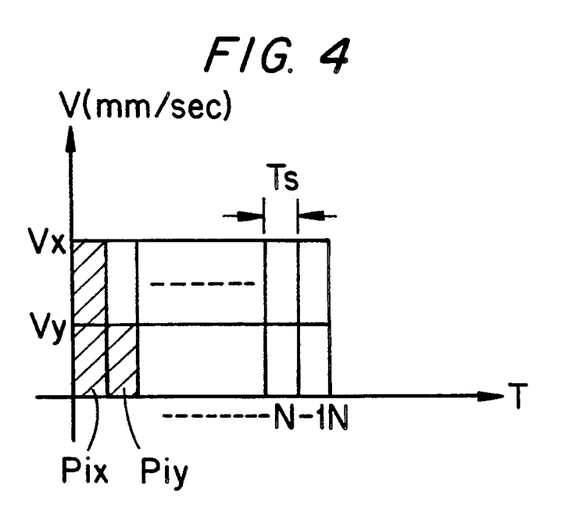
FIG. 4 is a graph which shows a distance to be moved by a robot on the X-Y coordinate system when no acceleration or deceleration is present.

As shown in FIG. 4, the distance Pix to be moved at every sampling time in case where no acceleration or deceleration is present toward X-axis direction is Pix=Px/N, and the distance Piy to be moved at every sampling time in case where no acceleration or deceleration is present toward Y-axis direction is Piy=Py/N, wherein the remainder is Riy.

For instance, in case where $$V = 1000[mm/sec], Ts = 10[msec],$$

$$Px = (Xi - Xf) = 400[mm],$$

$$Py = (Yi - Yf) = 200[mm],$$

because the maximum positional deviation Pmax is equal to the positional deviation Px of the X-axis, Pmax=Px=400 [mm], and the distance Pix to be moved at every sampling time in case where no acceleration or deceleration is present toward X-axis direction is Pix=V·Ts=1000 [mm/sec]×10 [msec]=10 [mm], and the number of times N is N=Px/Pix=400/10=40. Also, the distance Piy to be moved at every sampling time in case where no acceleration or deceleration is present toward Y-axis direction is Piy=Py/N=200/40=5[mm].

This, in cases where no acceleration or deceleration is present, the distances to be moved toward X-axis and Y-axis on the X-Y plane are respectively 10[mm] and 5[mm] up to a fortieth sampling, and the pulse numbers to be moved from two hundred first samplings are respectively zero [mm]. Accordingly, at a step S10, a positional increment quantity of each axis on the X-Y plane are obtained by the following expression.

$$\left.\begin{array}{l} Sx(k) = Pix(k) - Pix(k - n) + Sx(k - 1) \\ Vox(k) = Sx(k)/N \end{array}\right\} \quad (7)$$

$$\left.\begin{array}{l} Sy(k) = Piy(k) - Piy(k - n) + Sy(k - 1) \\ Voy(k) = Sy(k)/N \end{array}\right\} \quad (8)$$

On the other hand, a value to the left of the decimal point is compensated so as to obtain a more exact positional path by utilizing said expressions (7), and (8). These equations are executed at a step S11, namely, when a remainder of S(k)/N is R(k) at any selected time point (k), it is obtained by Si(k+1)=Pi(k+1)+R(k).

Wherein Pi: represents Pix and Piy,

S(k): represents Sx(k) and Sy(k).

When the positional increment quantity of each axis in the X-Y plane is obtained by said expressions (7), (8), a speed curve of the linear acceleration and deceleration is obtained. For instance, in case where the acceleration or deceleration time is set at 20, the acceleration time tacc and the deceleration time tdec are $$tacc = tdec = n \times Ts = 20 \times 10[msec] = 200[msec].$$

On the other hand, the acceleration and deceleration times tacc, tdec are appropriately selected in accordance with the characteristic of a machine system attached to the motor.

After the compensation of the value below the decimal point at said step S11 is executed, proceeding to a step S12 and the target positions Psx(k), Psy(k) of each axis in the X-Y plane at every sampling time are obtained by utilizing the following expressions.

$$Psx(k) = \sum_{i=0}^{k} Vox(i) \quad (9)$$

$$Psy(k) = \sum_{i=0}^{k} Voy(i) \quad (10)$$

and since at a step S12 the target position of each axis is obtained, at a step S13, the target positions of each axis at k time point are obtained in the articular coordinate system by utilizing the following expressions.

$$P\theta x(k) = \tan^{-1}\left(\frac{Psx(k)}{Psy(k)}\right) - \tan^{-1}\left[\frac{a_2 \sin \theta_2}{a_1 a_2 \cos \theta_2}\right] \quad (11)$$

$$P\theta y(k) = \cos^{-1} 1/2 \left[\frac{Psx(k)^2 + Psy(k)^2 - (a_1^2 + a_2^2)}{a_1 \, a_2}\right] \quad (12)$$

According to these, at a step S14, the positional deviations at any voluntary k time point are obtained by the following expressions.

$$P\theta x(k) = P\theta x(k) - C\theta x(k) \quad (13)$$

$$P\theta x(k) = P\theta y(k) - C\theta y(k) \quad (14)$$

(wherein $C\theta x(k)$, $C\theta y(k)$ are the present positional values which are read by the up/down counter 7 at every axis of any selected k time point).

Since at step S14 the positional deviation of each axis is discriminated, proceeding to a step S15, the proportional integral and differential PID control is executed on the positional deviation of each axis at the k time point of said step S14 and then inputs to the digital-/analog converter 2. That is, $$Dx\,out(k) = Kpx\,Pex(k) = Kix\left(\sum_{i=0}^{k} P\theta x(i) - \sum_{i=0}^{k} C\theta x(i)\right) +$$

$$Kdx\left(\frac{P\theta x(k) - P\theta x(k-1)}{T} - \frac{C\theta x(k) - C\theta x(k-1)}{T}\right)$$

-continued $$Dy \text{ out}(k) = Kpy \, P\epsilon y \, (k) = Kiy \left( \sum_{i=0}^{k} P\theta y \, (i) - \sum_{i=0}^{k} C\theta y \, (i) \right) +$$

$$Kdx \left( \frac{P\theta y(k) - P\theta y(k-1)}{T} - \frac{C\theta y(k) - C\theta y(k-1)}{T} \right)$$

wherein, T is a sampling time, Dx out and Dy out are values inputted to the digital/analog converter 2 of each axis, Kpx and Kpy are the proportional gains of each axis, and Kix and Kiy are the integral gains of each axis.

Further, Kdx and Kdy are the differential gains of each axis, and the proportional integral and differential gain of each axis as a step S15 is determined such that the movement state of the robot becomes optimum.

Therefore, said Dx out(k), Dy out(k) are output to the digital/analog converter 2, and the value converted into the analog value by said digital/analog converter 2 is input to the servo-control section 3 and drives the motor 4.

Successively, at a step S16, the k+1 value corresponding to another position of any voluntary time point k is substituted to the k and thereafter, advancing to a step S17, it is judged whether or not the value of k is equal to the number of times N of the moving pulse Pi at every sampling time in case where no acceleration or deceleration is present. When it is equal (when it is Yes), at a step S18 the value of Rix, Riy of each axis is obtained by seeking the number of times N of the moving pulse Pix, Piy at every sampling time. Where no acceleration is present, these values are obtained by substituting to the moving pulse Pix, Piy at each respective axis.

At step S19, it is judged whether or not the value of k is larger than the number of times N of the moving pulse Pi at every sampling time, and when it is larger (when it is Yes), the method advances to step S20 and computes, by substituting 0 to the moving pulse Pix, Piy at each respective axis. At step S21, it is judged whether or not it is a last target position. These steps are carried out by the microprocessor 1.

When a robot is at a last target position (when it is Yes), at said step S21, the driving of the robot is stopped. When it is not a last target position (when it is No), the method returns to step S10 and seeks the positional increment quantity Sx, Sy of each axis in the X-Y plane and then repeats the operation.

On the other hand, at said step S17, in case when the value of K is not equal to the number of times N of the moving pulse Pi at every sampling time (K, N, when it is No), the method proceeds directly to the step S19 and executes the operation, and at said step S19 when the value of K is not larger than the number of times N of the moving pulse Pi at every sampling time (when it is No), the microprocessor judges that the robot has almost reached the last target position, and proceeds to step S21 to judge whether or not it is a last target position of the robot, and repeats an appropriate operation in accordance with the result of this judgement.

Although the above-described embodiment is for the horizontal multi-articular robot, the present invention is of course applicable to a vertical multi-articular robot.

Thus, according to the linear interpolating method of a robot of the present invention, an end portion of the arm, i.e., an end effector of the robot, moves along the straight line in the X-Y plane of the rectangular coordinates and executes the linear acceleration and deceleration for the speed distribution of the straight line by the discrete time state equation. Therefore, the inventive method has an excellent effect in that not only the sampling time is reduced and the precision of the straight line is improved but also a high speed rectilinear movement is possible.

While the present invention has been described with reference to a particular embodiment, it should be apparent to one skilled in the art that many changes and modifications may be made without departing from the spirit and scope of the invention as defined in the claims.

What is claimed is:

1. A linear interpolating method for movement control of a robot, said method comprising the steps of:
   obtaining a present position of at least a part of said robot in a coordinate system;
   obtaining a target position of said at least part of said robot in a coordinate system;
   determining moving quantities, sampling times and number of sampling times during which said robot will move said at least part of said robot by said moving quantity along each axis to reach said target position, where no acceleration exists;
   computing a positional increment quantity to execute a linear acceleration where acceleration exists;
   computing a value of a moving pulse based on said positional increment quantity where acceleration exists and moving quantities where acceleration does not exist;
   compensating for a decimal value of the positional increment quantity;
   computing a positional deviation by detecting the present position of said at least part of said robot and executing a proportional integral and differential control of said positional deviation; and
   moving said robot based on said positional deviation.

2. A method in accordance with claim 1, wherein said target position is obtained by $$Xf = a_1 \cos \Theta_3 + a_2 \cos (\Theta_3 + \Theta_4)$$

$$Yf = a_1 \sin \Theta_3 + a_2 \sin (\Theta_3 + \Theta_4)$$

where Xf, Yf equal target position values in the X-Y plane;
   $a_1$, $a_2$ equal robot arms lengths; and
   $\Theta_3$, $\Theta_4$ equal last target values.

3. A method in accordance with claim 1, wherein said positional increment quantity is determined by $$Sx(k) = Pix(k) - Pix(k-n) + Sx(k-1)$$

$$Vox(k) = Sx(k)/n$$

$$Sy(k) = Piy(k) - Piy(k-n) + Sy(k-1)$$

$$Voy(k) = Sy(k)/n$$

where Sx, Sy equal a positional increment quantity of each axis; k is an integer; n is a constant; Vox, Voy equal velocity; and Pix, Piy equal a movement distance.

4. A method in accordance with claim 1, wherein said value of a moving pulse is determined by an inverse kinematical equation.

5. A method in accordance with claim 1, wherein the positional increment quantity computing step includes compensating step for a decimal value in expression as follows $$Si(k+1) = Pi(k+1) + R(k)$$

where Pi is a distance to be moved every sampling time; R(k) is a remainder of S(k)/n at a certain time; n is a constant; Si is a compensated value; and S(k) represents Sx(k) and Sy(k).

6. A linear interpolating method for moving an element of a robot in an X-Y plane comprising the steps of:
   determining a present position and a target position for moving the robot in the X-Y plane based on the present position and a last target position in a coordinate system;
   calculating a moving quantity in the X-direction and the Y-direction respectively for moving the robot in dependance on the present position and the target position in the X-Y plane;
   comparing the magnitudes of the moving quantities and assigning a velocity along the axis of the moving quantity which is larger;
   determining a number of steps and a distance the robot is moved along the axis of the larger moving quantity;
   computing a positional increment quantity based on the distance the robot is moved and compensating for a decimal value of the positional increment quantity;
   detecting a present position of the robot on each axis and calculating a positional deviation based on the present articular position and the moving pulse of each articulation; and
   executing proportional integral and differential control to the positional deviation and driving a servomotor of the robot based on said positional deviation.

* * * * *